W. M. HICKS.
Machine for Destroying Insects.
No. 216,614. Patented June 17, 1879.
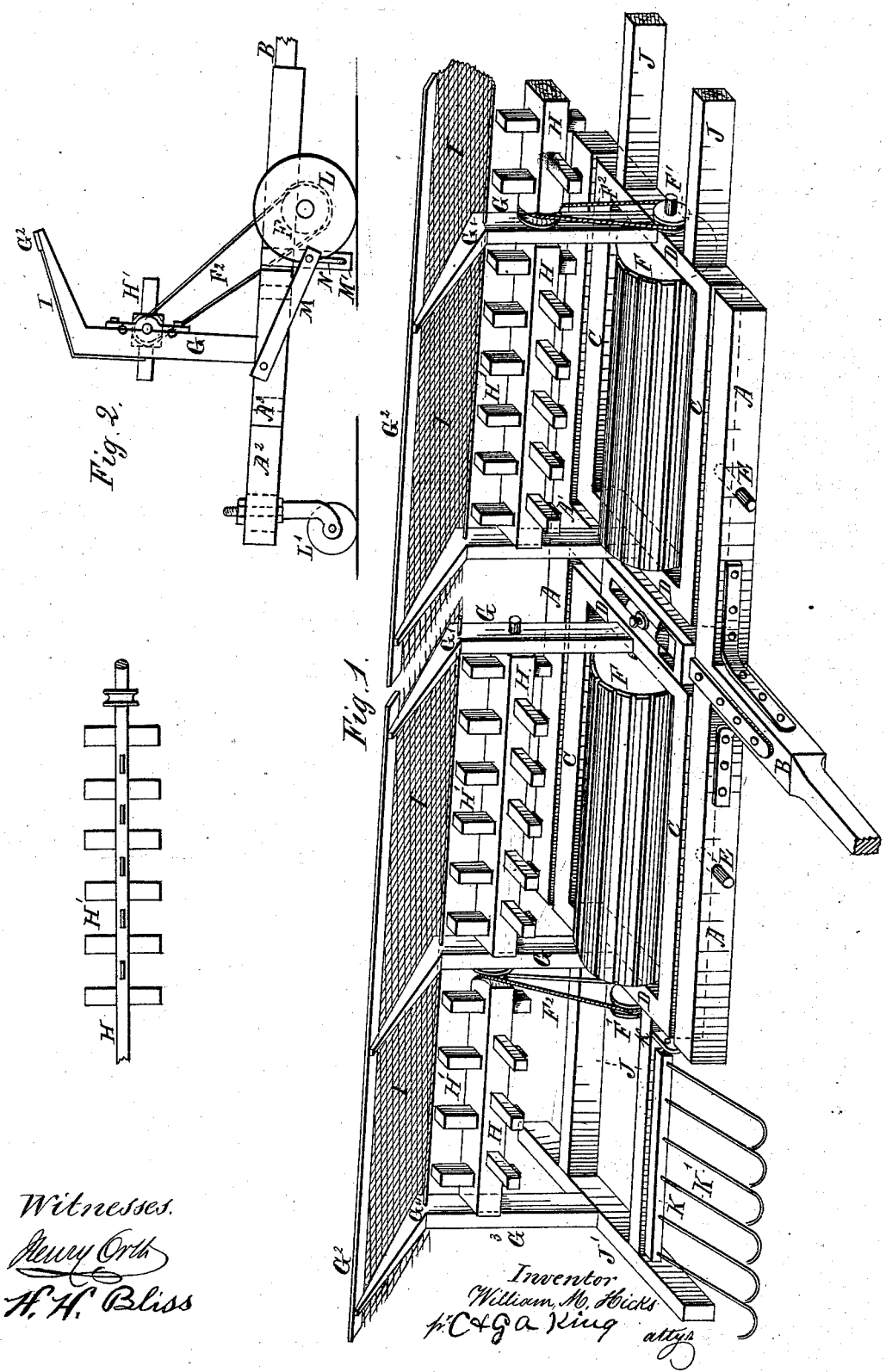

UNITED STATES PATENT OFFICE.

WILLIAM M. HICKS, OF BOLIVAR, MISSOURI.

IMPROVEMENT IN MACHINES FOR DESTROYING INSECTS.

Specification forming part of Letters Patent No. 216,614, dated June 17, 1879; application filed November 22, 1878.

*To all whom it may concern:*

Be it known that I, WILLIAM M. HICKS, of Bolivar, in the county of Polk and State of Missouri, have invented certain new and useful Improvements in Insect-Destroyers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to an improved machine for destroying grasshoppers and other insects.

It consists in combining, with a series of revolving beaters carried upon a horizontal shaft mounted at right angles to the path of the machine, a forwardly and upwardly projecting net or screen above said beaters, adapted to guide the insects downward and bring them within reach of the beaters. The frame in which these parts are mounted is transported by suitable means over the locality where the insects are to be destroyed.

Figure 1 illustrates the machine when used in connection with rollers and agitators. Fig. 2 is an end view of the device when mounted to move through standing grain.

In the drawings, H' H' represent a series of arms or beaters attached to and rapidly revolved by one or more shafts, H. These shafts H are mounted in lines perpendicular to the path of the machine, and traverse the full width of said path, so as to permit none of the insects therein to escape the beaters. They are mounted in a supporting-frame constructed as follows: G G are standards or uprights secured at the bottom to a suitable frame and journaled to receive the shafts H H, which are adapted to rotate therein.

In order to guide the insects downward and bring them within reach of the beaters H' H', nets I I are stretched above the shafts H, and are mounted so as to project forward and upward. They are supported by means of brackets G¹ G¹, which are attached at their rear ends to the standards G G, and are joined at their forward ends by a brace, G².

A rapid rotation is imparted to the shaft H and beaters H' by means of a cord or belt, F², which is actuated by the driving parts of the machine.

The grasshoppers, for the destruction of which this device is intended, generally move with the wind, and seldom fly higher than ten feet from the ground, and the nets I I are located in such manner as to intercept the highest and to throw them downward toward the beaters H'.

Any desired number of revolutions may be imparted to the shaft H, though I prefer to so arrange the shaft and the driving parts as to give about two hundred and forty revolutions in a minute to said shaft, in order to produce a great striking force with the beaters when coming in contact with the insects. The blow thus imparted by the beaters H' seldom fails to kill.

When the machine is to be used in short grass or grain, or on comparatively smooth ground, I combine with it a series of agitators, (adapted to startle the insects, so as to bring them within reach of the beaters,) and with a series of rollers adapted to crush the insects that remain on the ground, or that may be thrown down by the beaters.

When the machine is to be used in standing grain it is mounted on a device suitable to transport it above such grain.

In Fig. 1 I have shown the beaters and nets when combined with rollers adapted to crush the insects that may be upon the ground.

The above-described frame-work carrying the beaters is mounted upon the roller-frame, which is constructed as follows: A A are the longitudinal sills, and A¹ the central cross-girt of a main frame. Upon each side of the central girt, A¹, a supplemental frame is pivoted at E to the sills A A, consisting of the sills C C and cross-girts D D. The standards G G, which support the nets and beaters, are respectively attached to the pieces D D. Beneath the shafts H H, and in the frames C D, are mounted rollers F F.

When the rollers are mounted in these supplemental pivoted frames they can automatically adapt themselves to any unevenness of ground that may be met, and thus prevent the escape of any insects which may pass under them.

The rotation of the roller F is utilized to actuate the beater-shaft by means of a pulley or band-wheel, F¹, carried by said roller, and connected with the shaft by the cord or band F².

K represents a rock-shaft mounted at the front side of the ground-frame. K' K' are teeth or fingers attached to the shaft K and projecting forward. They are adapted to slide upon the ground and startle the insects, causing them to fly upward until they meet the net I or the beaters H' H'. The rock-shaft K permits the teeth to adapt themselves to the irregularities of the ground.

In Fig. 2, I have shown a modification of the device mounted upon a frame-work, A² A³, which, in turn, is mounted upon driving-wheels L and a caster-wheel, L'.

The pulleys F F are mounted upon the axle of the wheels L, and are rotated by said wheels when in motion. The cord F² rotates the shaft H and the beaters H'. When mounted in this manner the device is intended to move through standing grain.

The shaft H is mounted so as to be vertically adjustable in the standards G. In this case the net and the beaters are depended on to perform the work of destroying the insects as they fly over the tops of the plants.

M' M' are vertical brackets provided with a series of perforations. N is a rod supported in the brackets M and M', for the purpose of pressing down the grain while the machine is in motion, so that it (the grain) shall not be struck by the rotating beaters. The beater-arms H' H' are so attached to the shaft H as to leave no open space between them when they are revolving, thus insuring that there shall be no path for the escape of the insects.

What I claim is—

1. The combination of a series of beaters, which strike the insects while flying in the air, and a net or guide mounted on the beater-frame above and projecting in front of the beaters, to bring the insects within reach of the arms, substantially as set forth.

2. In combination with a series of beaters which strike the insects while flying in the air, rollers which crush the insects upon the ground, substantially as set forth.

3. In an insect-destroying machine, in combination with a main frame, two supplemental roller-frames independently pivoted to the main frame, whereby they adapt themselves independently of each other to the surface of the ground, substantially as set forth.

In testimony that I claim the foregoing as my own I affix my signature in presence of two witnesses.

WILLIAM M. HICKS.

Witnesses:
W. F. FREEMAN,
W. E. CLAYPOOL.